Sept. 27, 1960   R. V. BURTON   2,954,050
CONTROL VALVE
Filed Dec. 23, 1957
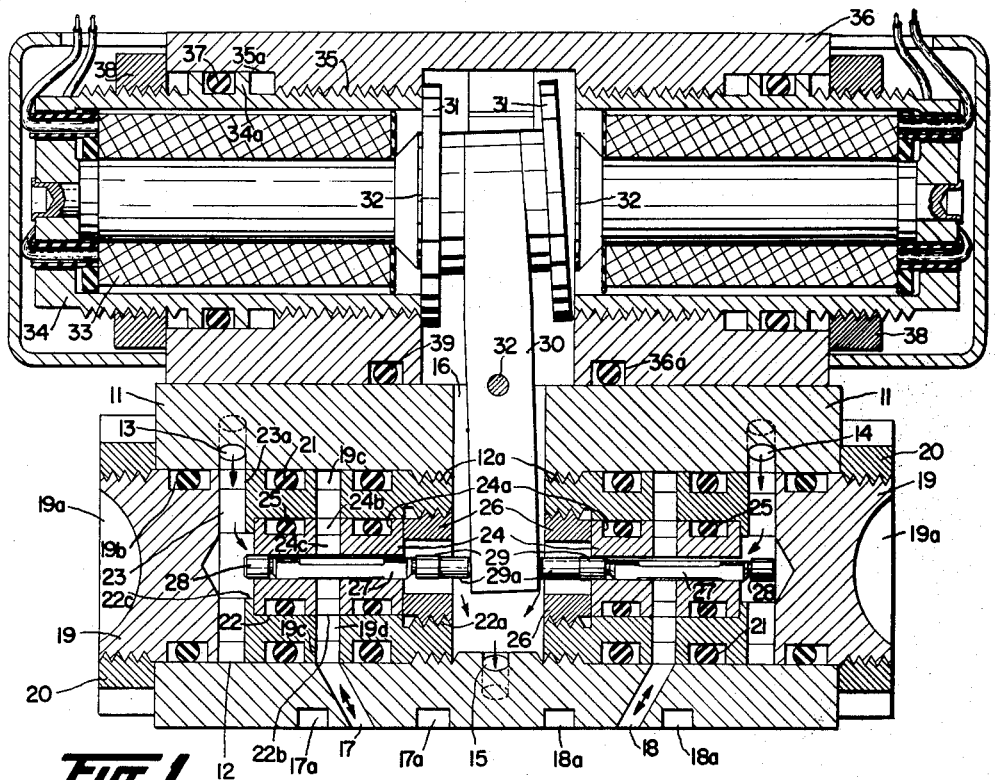
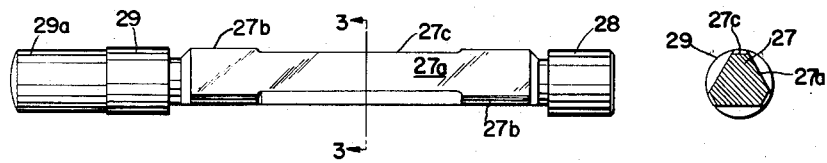
INVENTOR.
ROBERT V. BURTON
BY
*Alan M. Staubly*
ATTORNEY United States Patent Office 2,954,050
Patented Sept. 27, 1960

2,954,050
CONTROL VALVE

Robert V. Burton, Minneapolis, Minn., assignor to Minneapolis-Honeywell Regulator Company, Minneapolis, Minn., a corporation of Delaware Filed Dec. 23, 1957, Ser. No. 704,379

7 Claims. (Cl. 137—622)

This invention relates to control valves in general and, more particularly, to control valves of the spool or dowel pin type which are used to control the supply of an actuating fluid to fluid pressure motors. Valves of this type are used quite extensively in aeronautical controls and, due to the exacting requirements of valves so used, efforts are constantly being made throughout the industry to make better and more reliable valves of this type.

One of the objects of this invention is to provide a valve of the type mentioned above which is so designed as to be less susceptible to silting, which is one of the greatest problems in valves of this type.

Another object of the invention is to provide a spool type of valve wherein the elements of the valve may be assembled with more exactness as to the relative position of parts than the prior art valves of comparable use.

A further object of the invention is to provide a double spool valve arrangement for controlling a pressure operated motor wherein each of the valves is held in operating engagement with a common actuator by means of the pressure fluid controlled by the valves to actuate the pressure motor.

Another object of the invention is to provide a detachable spool valve and cooperable valve seat which may be manufactured to very close tolerances prior to assembly in the valve body.

A still further object of the invention is to provide a control valve of the three port type wherein the heads of the valve for control of the flow into the valve and out of the valve are located in the inlet and outlet flow streams, respectively.

Still further objects of the invention will become apparent upon the reading of the following detailed description of the invention in conjunction with the accompanying drawing wherein:

Figure 1 is a vertical sectional view through the control valve;

Figure 2 is an elevational view of the valve spool or dowel pin; and

Figure 3 is a cross section of the spool valve taken along lines 3—3 of Figure 2.

The control valve comprises a valve body 11 having a bore 12 extending lengthwise therethrough, two fluid flow inlet passages 13 and 14 near opposite ends of the body, an outlet 15 extending from the central portion of the body to the outer surface thereof, a large bore 16 diametrically opposite the outlet 15 to receive an actuator for the valve, to be presently described, and two inclined two way flow passages 17 and 18 extending from the bottom surface of the valve body to the bore 12 between the inlet 13 and the outlets 14 and 15, respectively. The valve body has an annular groove 17a around the passage 17 and an annular groove 18a around the passage 18 for the reception of an O-ring to seal the control valve against a pressure operated motor (not shown) to be controlled by the control valve.

Located in each end of the bore 12 of the valve body is a valve seat member or sub-assembly 19 that is externally threaded at each of its ends to enable it to be threaded into threads 12a near the center of the bore 12 and to receive a locking nut 20 at its outer end after it is once properly positioned in the valve body. A screw slot 19a enables each valve seat member to be adjusted in the valve body by means of a screw driver. The seat member also has three annular grooves 19b therein in which are positioned three O-rings 21 which prevents leakage between the inlet 13, the two way flow passages 17 and 18 and the outlet 15. Each member 19 has a stepped bore 22 extending coaxially into the inner end thereof with the outer or largest diameter portion 22a being threaded, the intermediate diameter and longer portion thereof communicating with the two way flow passage 17 or 18 through radial bores 19d and an annular groove 19c and the smaller diameter bore 22c forming an abutment shoulder and communicating with the inlet 13 or 14.

Positioned in the intermediate portion 22b of each of the stepped bores 22 is a sleeve or valve seat 24 having annular grooves 24a therein with two O-rings 25 positioned in the grooves to form a seal between each of the ends of the sleeve and an intermediate annular groove 24b and radial bores 24c. It is thus seen that sleeve 24, when positioned against the inner end of the bore 22b and held in place by a nut 26, provides a valve seat sub-assembly that may be readily inserted, adjusted as to position and then locked in proper adjusted position in the valve body, to provide for the control of fluid under pressure from a supply source to a motor means and to exhaust the fluid from the motor means to a return or outlet passage.

The means for controlling the flow of fluid from a fluid source to the motor comprises a spool or dowel pin valve 27 positioned in the sleeve 24 with the heads 28 and 29 thereof positioned to cooperate with the adjoining ends of the sleeve 24, to control the flow of fluid into and out of the two way flow passage 17. Neither of the heads 28 or 29 serve as guide means for the spool as that function is performed by an intermediate and generally triangular-shaped body portion of the valve having three flat sides 27a, three rail portions 27b extending between the flat sides around the ends of the body portion and three recess portions 27c between the rails 27b thereof to serve as communication passages between the flat sides of the valve body. Each of the heads 29 has an extension 29a that projects into the bore 16.

The left valve, as illustrated in the drawing, is in the position which permits fluid to be exhausted from a pressure motor through the two way flow passage 17, through passages 24c, 24b, along the body of the valve, and past the head 29 to the exhaust port 15. The right valve is in the opposite position with the head 29 slightly within the sleeve 24 and the head 28 out of the sleeve. In this valve, fluid under pressure would enter the inlet 14, flow through passages 23, 23a and past head 28, along the flat sides of the valve body, through the passages 24b and 24c, and through the two way flow passage 18 to the pressure motor to cause actuation thereof.

While only one of the valves could be used to actuate a fluid operated motor having a spring return for the motor means, if it is desired to have the fluid motor operated in both directions by the pressure fluid, an arrangement such as that shown in the drawing is necessary. That is the provision of two control valves which simultaneously operate in opposite directions and thus alternately supply pressure fluid to opposite sides of the piston or other movable wall of the fluid motor.

An actuating lever 30 carries a pair of armatures 31 at its upper end, is pivoted intermediate its end on a pivot 32 and has its lower or inner end positioned between the opposed ends of the extensions 29a of each of the spool valves. It will be noted that the upper end of the lever 30 is slightly beveled so that the two armatures are inclined slightly to the longitudinal axis of the lever 30 so that they will be parallel with the adjacent ends of the solenoid or magnetic cores 32 of conventional electromagnets 33 when attracted thereto. The electromagnets are sealed in housings 34 which, in turn, are adjustably screw-threaded into threaded bores 35 of a top casting 36 of the control valve. An unthreaded larger diameter bore 35a receives a pair of annular ribs 34a on the housing with an O-ring therebetween to seal the housing 34 of the electromagnet within the housing 36. As in the case of the valve assembly, the solenoid housing is locked in its adjusted position in the housing 36 by means of a locking nut 38. The housing 36 is readily removable from the valve body 11 in that it is bolted thereto by means of bolts (not shown) with an O-ring 39 surrounding the bore 16 and located in an annular groove 36a in the top casting 36.

From the above description of the invention, it is readily apparent that the control valve may be very accurately calibrated for performance, that the various parts of the valve may be readily removed for servicing and that due to the position of the heads of the spool valves in the flow streams of the pressure fluid, the likelihood of silting is reduced to a minimum. Furthermore, it is to be noted that there is only one critical measurement in the manufacture of the valve and that is the relative lengths of the sleeve members 24 and the distance between the heads upon the cooperating valve. By the holding of these dimensions to a reasonable manufacturing tolerance, the cost of the valve construction is kept relatively low.

While I have described the preferred embodiment of my invention, it is deemed to be obvious that those skilled in the art may make modifications thereof without departing from the spirit of the invention. Therefore, it is to be understand that the scope of the invention is to be determined from the appended claims.

I claim as my invention:

1. A control valve for a fluid operated motor comprising a pair of coaxially spaced and aligned spool valves, a sleeve for each of said valves and having each of their outer ends in communication with a fluid inlet and each of their inner ends being in spaced relationship and in communication with a common outlet, said valves having an outer diameter which passes into the inner diameter of said sleeves, each of said sleeves having an annular groove intermediate its ends and a passage extending from said groove to the interior of said sleeve for conducting fluid to and from a pressure operated motor, a pair of heads on each of said valves spaced apart a distance equal to the length of the surrounding sleeve, and actuating means positioned between the opposing ends of said valves for simultaneously actuating said valves.

2. A control valve for a fluid operated motor comprising a pair of coaxially spaced and aligned spool valves, a sleeve for each of said valves and having each of their outer ends in communication with a fluid inlet and each of their inner ends being in spaced relationship and in communication with a common outlet, said valves having an outer diameter which passes into the inner diameter of said sleeves, each of said sleeves having a passage extending through a wall of said sleeve intermediate its ends for conducting fluid to and from a pressure operated motor, a pair of heads on each of said valves spaced apart a distance equal to the length of the surrounding sleeve, and actuating means positioned between the opposing ends of said valves for simultaneously actuating said valves.

3. A control valve for a fluid operated motor comprising a spool valve, a sleeve for said valve and having its outer end in communication with a fluid inlet and its inner end in communication with an outlet, said valve having an outer diameter which passes into the inner diameter of said sleeve, said sleeve having an annular groove intermediate its ends and a radial passage extending from said groove to the interior of said sleeve, a second passage extending from said annular groove for conducting fluid to and from a pressure operated motor, a pair of heads on said valve spaced apart a distance equal to the length of the surrounding sleeve, and actuating means operably engaging said valve.

4. In a control valve for a fluid actuated motor, the combination comprising a valve body having an inlet and an outlet and a two-way flow passage for conducting fluid to and from a pressure operated motor, a bore in said body having one end communicating with said inlet and the other end communicating with said outlet and an intermediate portion of said bore communicating with said two-way flow passage, a spool valve having two heads having an outer diameter which passes into the inner diameter of said sleeve being spaced apart a distance substantially equal to the length of said bore and being movable into and out of said bore, said valve having at least a portion of its surface spaced from the wall of said bore between said heads to permit fluid flow between said two-way flow passage and said heads, the remaining portion of said valve between said heads serving as a guide for said heads, and means engaging the valve at one end thereof to control the position of said valve in said bore.

5. In a control valve for a fluid actuated motor, the combination comprising a valve body having an inlet and an outlet and a two-way flow passage for conducting fluid to and from a pressure operated motor, a bore in said body having one end communicating with said inlet and the other end communicating with said outlet and an intermediate portion of said bore communicating with said two-way flow passage, a spool valve having two heads having an outer diameter which passes into the inner diameter of said sleeve being spaced apart a distance substantially equal to the length of said bore and being movable into and out of said bore, said valve having a plurality of surface portions spaced from the wall of said bore between said heads to permit fluid flow between said passage and said heads, the remaining portion of said valve between said surface portions and said heads serving as a guide for said heads, said remaining portion having a centrally recessed edge between said surface portions, and means engaging the valve at one end thereof to control the position of said valve in said bore.

6. In a control valve for a fluid operated motor, the combination comprising a pair of coaxially spaced and aligned spool valves, a valve body having a bore therein for each of said valves and having each of the outer ends of said bores in communication with a fluid inlet and each of the inner ends being in spaced relationship and in communication with a common outlet, said valves having an outer diameter which passes into the inner diameter of said sleeves, each of said bores having a passage extending from the exterior of said body to the interior of said bore intermediate its ends for conducting fluid to and a pressure operated motor, a pair of heads on each of said valves spaced apart a distance equal to the length of the surrounding bore, said valve having a passage in the surface thereof between said heads, and actuating means positioned between the opposing ends of said valves for simultaneously actuating said valves.

7. In a control valve for a fluid operated motor, the combination comprising a pair of coaxially spaced and aligned spool valves, an axially adjustable sleeve for each of said valves and having each of their outer ends in communication with a fluid inlet and each of their inner ends being in spaced relationship and in communication with a common outlet, said valves having an outer diameter which passes into the inner diameter of said sleeves, each of said sleeves having an annular groove intermediate its ends and a radial passage extending from said groove to the interior of said sleeve, a second passage extending from said groove away from said sleeve for conducting fluid to and from a pressure operated motor, a pair of heads on each of said valves spaced apart a distance equal to the length of the surrounding sleeve, and actuating means positioned between the opposing ends of said valves for simultaneously actuating said valves.

References Cited in the file of this patent

UNITED STATES PATENTS

| 2,466,795 | Crot | Apr. 12, 1949 |
| 2,586,906 | Beckett et al. | Feb. 26, 1952 |

FOREIGN PATENTS

| 246,086 | Switzerland | Sept. 1, 1947 |
| 832,820 | Germany | Feb. 28, 1952 |